I. H. JEWELL.
FILTER.
APPLICATION FILED FEB. 6, 1907.
921,115.
Patented May 11, 1909.
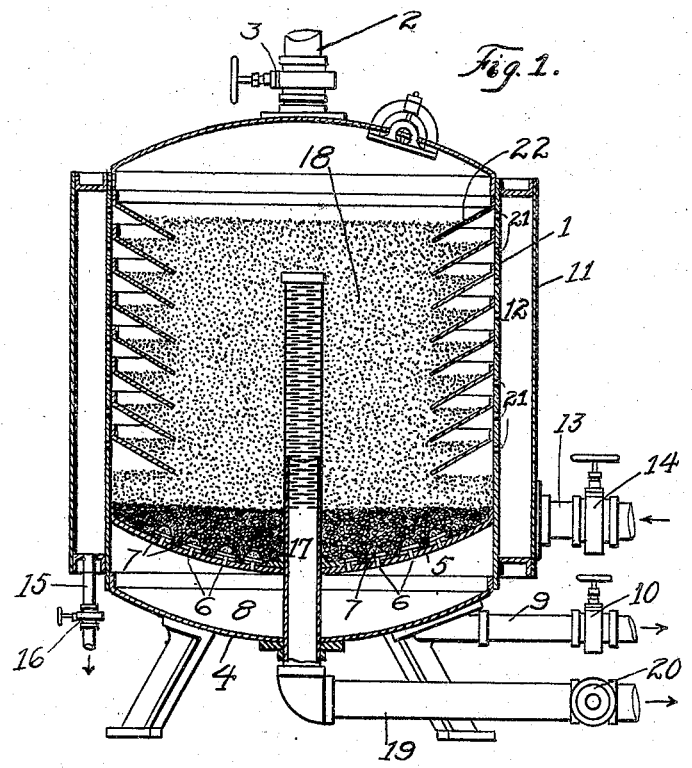
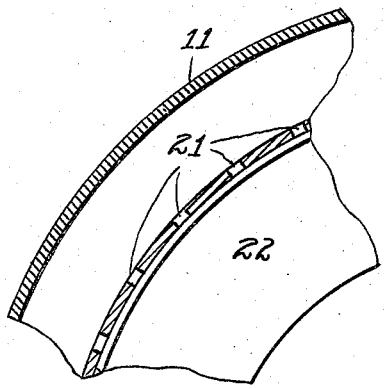
Fig. 2.
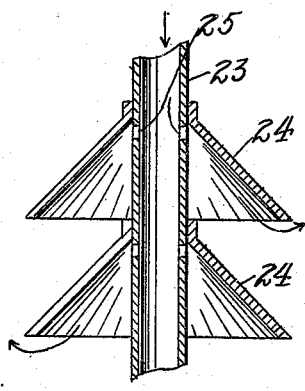
Fig. 3.
WITNESSES:
INVENTOR
Ira H. Jewell
BY Hill & Hill,
ATTORNEYS.

UNITED STATES PATENT OFFICE.

IRA H. JEWELL, OF CHICAGO, ILLINOIS.

FILTER.

No. 921,115.  Specification of Letters Patent.  Patented May 11, 1909.

Application filed February 6, 1907. Serial No. 355,984.

*To all whom it may concern:*

Be it known that I, IRA H. JEWELL, a citizen of the United States, residing at Chicago, in the county of Cook and State of Illinois, have invented a certain new and useful Filter, of which the following is a description.

My invention belongs to that general class of devices in which a fluid is treated by permitting it to percolate through a granular bed, and in which means are provided for cleansing the bed from time to time, as necessity may require.

My invention has for its object a simple and effective filter employing such a method of filtration, and of cleansing the bed.

To this end it consists of the novel structure herein set forth, and more particularly pointed out in the claim.

In the drawings, wherein like or corresponding reference characters indicate like or corresponding parts,—Figure 1 is a vertical section of a filter of the general type referred to, commonly known as a pressure filter, constructed to carry out my invention in its operation. Fig. 2 is a fragmentary cross-section of the construction shown in Fig. 1, and Fig. 3 is a detail of a modification of a certain part of the filter.

In the drawings, 1 represents a suitable tank which is preferably closed at the top, and provided with a pipe 2 controlled by a valve 3.

4 is the bottom of the tank and positioned above the bottom of the tank and spaced therefrom is a supporting shelf or bottom 5 provided with a plurality of inlets 6, each provided with a screen or equivalent part 7. The distance between the bottom 4 and the screen bottom 5, is sufficient to provide a chamber 8 for the reception of the filtered liquid when downward filtration is employed. A pipe 9, provided with a valve 10, serves to conduct the fluid from the chamber 8.

Arranged outside of the tank 1 is a secondary inclosing tank 11, spaced from the tank 1 to provide a chamber 12. The annular chamber 12 is provided with an inlet pipe 13, controlled by a valve 14, and by a drain pipe 15, controlled by valve 16. A receiving core 17 is positioned within the bed 18, a pipe 19 controlled by valve 20, serving to conduct the filtered water from the core.

In the form shown in Fig. 1, a plurality of apertures 21, formed in the outer shell of the tank 1, serves to admit fluid from the annular chamber 12 to the filter bed. A plurality of hoods 22, corresponding in number with the rows of apertures 21, are secured to the inner wall of the tank 1, and extend inward at an angle therefrom, covering the apertures 21, as shown.

When employed in lateral filtration alone, the valve 3 in the pipe 2, and 10 in the pipe 9, are closed. The fluid is admitted through the pipe 13 to the annular chamber 12, and thence to the spaces beneath the several hoods 22. From this point the liquid percolates through the bed, laterally to the core 17, and is thence conducted by the pipe 19 to the clear well, the valve 20 being opened for that purpose. If, in addition to this, it is desired to also secure the coöperation of vertical filtration, the valve 3 in the pipe 2 is opened, permitting the entrance of the fluid at that point, and the valve 10 in the pipe 9 is also opened, drawing off the filtered water from the chamber 8.

When it is desired to cleanse the bed, the valves 10 and 20 are closed, while the valve 3 in the pipe 2 is opened, for the purpose of discharging the waste water. The pressure through the lateral openings 21 will cause the bed in proximity to the hoods 22 to liquefy to a certain extent, and the increased agitation by the introduction of the water in a lateral direction, will serve to agitate the bed and carry off any material deposited in the several spaces below the hoods. The waste water, as before stated, after filling the tank escapes by way of the pipe 2.

It will be observed that in the process of washing, the ratio of the outlet resistance, as compared to the inlet pressure, is decreased, causing a more rapid flow of the fluid through the apertures 12, to secure the necessary liquefying and agitation of the bed; that is to say, during the ordinary process of filtration, the resistance of the outlet is such as compared with the inlet pressure, that the bed is not agitated, but the fluid gradually percolates therethrough, finally escaping from the bed, as before described. When washing the bed, however, the ratio between the outlet resistance and inlet pressure must be changed, to secure a more rapid current of the fluid through the bed. It is obvious that while the filter shown in Fig. 1 is adapted for combined use, both as to filtering and washing, a slight modification will adapt the lateral movement of the fluid to washing purposes only. In such a construction, the outer tank 11 may be dispensed with, and only a few of the lower hoods employed, suitable pipe connections being made to conduct the wash water to the filter at those points.

If, in the form shown, it be desired to secure an upward washing of the bed alone, the fluid may be permitted to fill the annular chamber 12, when the valve 14 will then be closed; the valve 20 will be closed, and the wash water will be admitted through the pipe 9, the waste water escaping through the pipe 2, as before described. By this means there will be no tendency of the current beneath the hoods, and through the apertures 21, as the water or fluid in the chamber 12 will prevent such action. The small pipe 15 with its valve 16 may be employed to drain the chamber 12 to carry off any contained sediment arising from sedimentation therein.

As shown in Fig. 2, the apertures 21 preferably extend around the tank 1, being arranged at regular intervals on the same horizontal line, a hood 22 being positioned immediately above each horizontal row of apertures.

Fig. 3 shows a modified form, principally for washing purposes. The pipe 23, as shown, may be vertically inserted in the bed at one or more points, and provided with a plurality of hoods 24 positioned thereon, each covering a horizontal row of apertures 25. During the filtering operation, the fluid will enter the pipe and escape through the apertures 25 beneath the hoods 24, as before described, percolating thereafter through the bed, and finally escaping as set forth. During the washing operation, the fluid also passes through in the same direction, its current or velocity being increased as before set forth.

It is obvious that if desired the cleansing operation may be accomplished by the coöperation of the upward reverse current with the lateral current referred to. In this connection a reverse current may also be driven through the core 17, securing simultaneous agitation of the bed in three directions in the cleansing operation.

Having thus described my invention, what I claim as new and desire to secure by Letters-Patent is:

A filtering apparatus comprising a casing closed at the top and bottom and having perforate side walls, a plurality of superposed downwardly directed and separated deflector plates secured to the inner wall of said casing, a second casing surrounding the first named casing, means for conducting fluid to said second casing, a centrally disposed perforate core, and a granular bed surrounding said core said plates being considerably greater in width than the distance between them and said plates lying at an angle approximating ninety degrees to the perforate side walls of the casing as and for the purposes set forth.

In testimony whereof, I have hereunto signed my name in the presence of two subscribing witnesses.

IRA H. JEWELL.

Witnesses:
 E. A. GARDNER,
 CHARLES I. COBB.